(12) United States Patent
Schroder et al.

(10) Patent No.: US 8,573,618 B2
(45) Date of Patent: Nov. 5, 2013

(54) WHEEL SUSPENSION OF A MOTOR VEHICLE

(75) Inventors: Aloys Schroder, Paderborn (DE);
Christian Schnabel, Paderborn (DE);
Jurgen Von Der Kall, Paderborn (DE);
Rodscha Drabon, Salzkotten (DE)

(73) Assignee: Benteler Automobil Technik GmbH, Paderborn (DE)

( * ) Notice: Subject to any disclaimer, the term of this patent is extended or adjusted under 35 U.S.C. 154(b) by 0 days.

(21) Appl. No.: 13/309,606

(22) Filed: Dec. 2, 2011

(65) Prior Publication Data

US 2012/0139205 A1 Jun. 7, 2012

(30) Foreign Application Priority Data

Dec. 3, 2010 (DE) .................. 10 2010 061 018

(51) Int. Cl.
*B60G 11/08* (2006.01)
*B60G 7/00* (2006.01)

(52) U.S. Cl.
USPC .............................. 280/124.135; 280/124.171

(58) Field of Classification Search
CPC ........ B60G 11/08; B60G 11/10; B60G 11/12; B60G 2202/114
USPC .................... 280/124.134, 124.135, 124.171, 280/124.175; 267/246
See application file for complete search history.

(56) References Cited

U.S. PATENT DOCUMENTS

| | | | |
|---|---|---|---|
| 23,401 A | 3/1859 | Shuler | |
| 1,502,616 A * | 7/1924 | Church | 267/266 |
| 1,536,981 A * | 5/1925 | Stossel | 267/266 |
| 2,039,983 A * | 5/1936 | Schlirf | 267/246 |
| 2,353,603 A * | 7/1944 | Vancoppenolle | 267/244 |
| 2,496,906 A | 2/1950 | Churchill | |
| 2,501,796 A * | 3/1950 | Tucker | 280/124.137 |
| RE23,401 E * | 8/1951 | Vancoppenolle | 267/244 |
| 3,806,151 A * | 4/1974 | Prasniewski | 280/124.113 |
| 4,858,950 A * | 8/1989 | Kajiwara et al. | 280/6.15 |
| 4,867,474 A * | 9/1989 | Smith | 280/5.507 |
| 5,826,896 A * | 10/1998 | Baumann | 280/124.171 |
| 6,029,987 A * | 2/2000 | Hoffman et al. | 280/124.171 |
| 6,189,904 B1 * | 2/2001 | Gentry et al. | 280/124.175 |
| 6,863,290 B2 * | 3/2005 | Yokoyama | 280/124.171 |
| 8,070,172 B1 * | 12/2011 | Smith et al. | 280/124.103 |

FOREIGN PATENT DOCUMENTS

| | | |
|---|---|---|
| DE | 42 01 180 | 7/1992 |
| DE | 195 42 108 | 5/1996 |
| DE | 693 04 236 | 2/1997 |
| EP | 0 058 950 | 9/1982 |
| EP | 0563810 A1 * | 10/1993 |

OTHER PUBLICATIONS

German Office Action of corresponding application No. 10 2010 061 018.6.

* cited by examiner

*Primary Examiner* — Joseph Rocca
(74) *Attorney, Agent, or Firm* — Barnes & Thornburg LLP

(57) ABSTRACT

A wheel suspension of a motor vehicle. The wheel suspension includes a suspension arm supported on a linkage point on a car body of the motor vehicle. A transverse leaf spring is arranged along a transverse axis of the motor vehicle and coupled at an end of the transverse leaf spring with the wheel suspension. The transverse leaf spring is supported via a bearing on the car body. An end of the transverse leaf spring is coupled in an articulated manner with the suspension arm and spaced apart from a wheel-side end of the suspension arm.

4 Claims, 1 Drawing Sheet

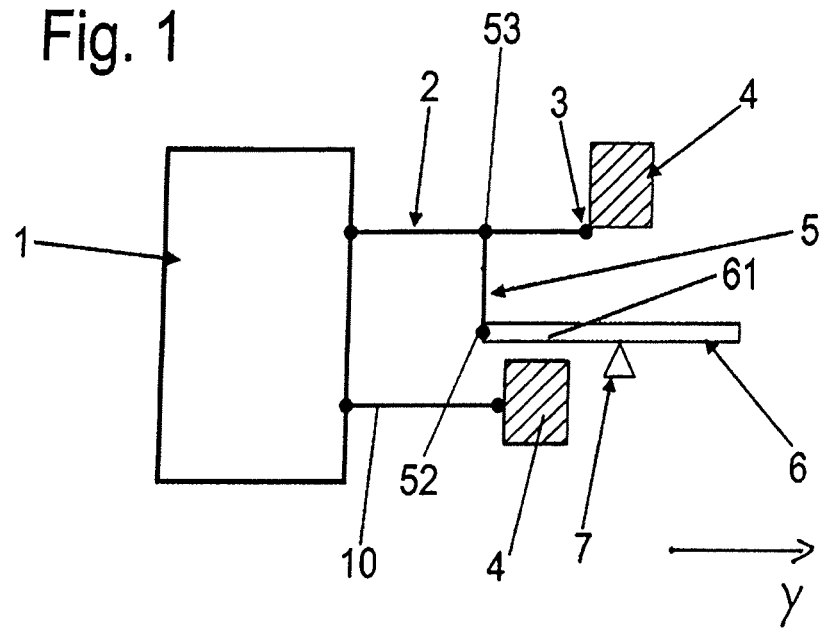
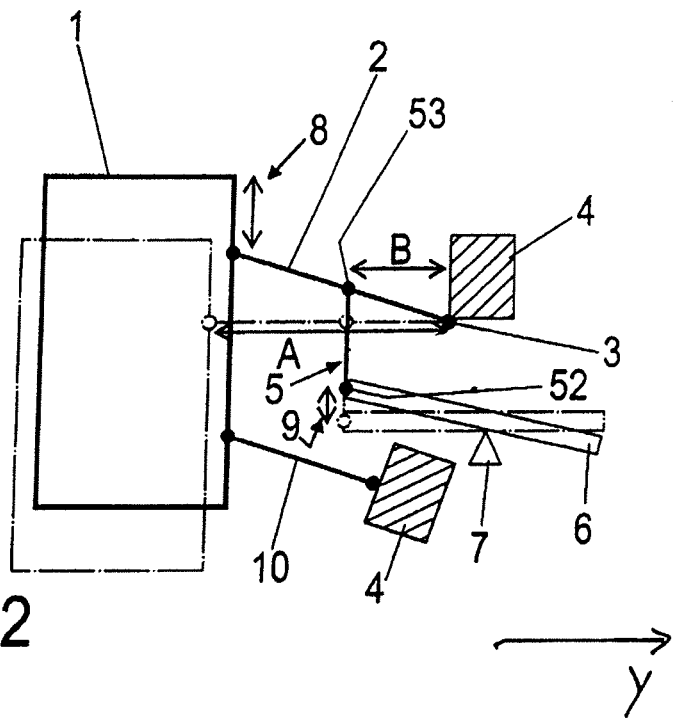

WHEEL SUSPENSION OF A MOTOR VEHICLE

This application claims benefit of and priority to German Patent Application No. 10 2010 061 018.6, filed on Dec. 3, 2010, the content of which Application is incorporated herein by reference.

BACKGROUND AND SUMMARY

The present disclosure relates to a wheel suspension, such as a rear suspension of a motor vehicle. The wheel suspension includes a suspension arm supported on a linkage point on a car body of the motor vehicle. A transverse leaf spring is arranged along a transverse axis of the motor vehicle and is coupled at an end of the transverse leaf spring with the wheel suspension. The transverse leaf spring is supported via a bearing on the car body.

Wheel suspensions of motor vehicles are known from the state of the art, in which transverse leaf springs are linked directly to a stub axle or a lower suspension arm. The transverse leaf springs are either linked directly to the respective components or are connected with the respective components via connecting rods. In such conventional wheel suspensions, the transverse leaf spring in this chassis is partly not only used for damping the chassis but also assumes the task of a stabilizer.

In such conventional wheel suspensions, the compression of a wheel leads to a respective deflection of the transverse leaf spring arranged along a transverse axis of the motor vehicle. This deflection of the transverse leaf spring leads to a very high load on the bearings with which the transverse leaf spring is fastened to the car body or on an auxiliary frame of the motor vehicle which is connected with the car body. In this case, a rotation of the transverse leaf spring occurs in the bearing on the one hand, and the transverse leaf spring is also displaced along the transverse axis of the motor vehicle on the other hand, so that it is also necessary to consider a translatory movement of the transverse leaf spring in the construction of a respective bearing for bearing the transverse leaf spring on the stub axle.

Respective solutions for such a bearing are known, for example, from DE 42 01 180 A 1, in which the bearing is rotationally mounted itself and the translation of the transverse leaf spring along the transverse axis of the vehicle is realized by bearing rubbers. As a result of the possibilities for movement to be considered for the transverse leaf springs, such bearings need to be arranged in a relatively complex manner as compared with simple bearing clamps. Moreover, it is also necessary to consider that a large amount of space is needed in the overall construction of the respective axle as a result of the strong spring deflection of the transverse leaf spring which is produced in the known wheel suspension constructions by the compression of a wheel.

However, the present disclosure provides for a wheel suspension, for example, in which the linkage of the ends of the transverse leaf spring allows maintaining the overall space of the transverse leaf spring and simultaneously enables a simpler bearing of the transverse leaf spring.

Thus, the present disclosure relates to a wheel suspension of a motor vehicle. The wheel suspension includes a suspension arm supported on a linkage point on a car body of the motor vehicle. A transverse leaf spring is arranged along a transverse axis of the motor vehicle and is coupled at an end of the transverse leaf spring with the wheel suspension. The transverse leaf spring is supported via a bearing on the car body. An end of the transverse leaf spring is coupled in an articulated manner with the suspension arm and spaced apart from a wheel-side end of the suspension arm.

In accordance with the present disclosure, the wheel suspension is arranged with an upper suspension arm which is supported on a linkage point on the car body or an auxiliary frame of the motor vehicle. The wheel suspension also includes a transverse leaf spring which is arranged along a transverse axis of the vehicle and is coupled at its ends with the respective wheel suspension and is supported by respective bearings on the car body or an auxiliary frame of the motor vehicle in such a way that each of the ends of the transverse leaf spring is coupled in an articulated manner to the upper suspension arm of the wheel suspension spaced from the wheel-side end of the suspension arm.

By coupling the transverse leaf spring to the upper suspension arm, an arrangement of the spring beneath the suspension arm is enabled, which occurs in a manner in which no torque is generated around the transverse axis of the motor vehicle in the case of the transmission of power as a result of a compression of a wheel.

Embodiments, including advantages of the embodiments, according to the present disclosure, are discussed herein and in the appended claims.

According to an advantageous embodiment of the wheel suspension of the present disclosure, the ends of the transverse leaf spring are mounted in an articulated manner on a connecting rod mounted in an articulated manner on the upper suspension arm. It is ensured, as a result of this kind of linkage of the transverse leaf spring on the upper suspension arm, that the length of stroke of a wheel or stub axle is not transmitted to the spring to the same extent. The position of the linkage of the transverse leaf spring on the upper suspension arm leads to a transmission ratio between the stroke of the wheel and the stroke of the transverse leaf spring which results in a lower deflection of the transverse leaf spring during the compression of a wheel.

In accordance with an advantageous embodiment of the wheel suspension of the present disclosure, the connecting rod is centrally mounted on the upper suspension arm along the transverse axis of the motor vehicle. By arranging the connecting rod at this position of the upper suspension arm, the stroke of the transverse spring in relation to the stroke of the wheel or stub axle can be reduced to half the value. The lower deflection of the transverse leaf spring advantageously also reduces the overall need for space of the transverse leaf spring within the wheel suspension.

In accordance with an advantageous embodiment of the wheel suspension in accordance with the present disclosure, the connecting rod is arranged to be H-shaped in its cross-section, with the upper suspension arm being pivotably mounted in the upper opening of the H and the transverse leaf spring being pivotably mounted in the bottom opening of the H. This reduces the rotation of the transverse leaf spring in the spring bearing, so that a simply arranged bearing, for example, a rubber bearing or a rubber-metal bearing, can be used in order to connect the individual components with one another.

Other aspects of the present disclosure will become apparent from the following descriptions when considered in conjunction with the accompanying drawings.

BRIEF DESCRIPTION OF THE DRAWINGS

FIG. 1 shows a schematic view of an embodiment of a wheel suspension, in accordance with the present disclosure, in a compressed position.

FIG. 2 shows a schematic view of the embodiment of the wheel suspension of FIG. 1 in a rebound position.

DETAILED DESCRIPTION

In the following description, the terms such as top, bottom, left, right, front, back, for example, relate to the exemplary illustrations as shown in the drawings and to the positions of the wheel suspension, the transverse leaf spring, the suspension arm and other parts. These terms shall not be understood as limiting, meaning that these term references may change through various working positions or, for example, with relation to mirror-symmetric configurations.

FIGS. 1 and 2 show a schematic illustration of a wheel or stub axle configuration. Reference numeral 1 relates to a wheel or a stub axle which is supported via an upper suspension arm 2 on a linkage point 3 on a car body 4 or an auxiliary frame of the car body 4. The stub axle 1 configuration may include a five-link system, or, for example, a four-link rear suspension or a control axle of a motor vehicle with an upper and bottom suspension arm 2, 10, respectively, and a longitudinal control arm. FIGS. 1 and 2 show the upper suspension arm 2 and the bottom suspension arm 10, the upper suspension arm 2 being supported on a linkage point 3 of the car body 4 or may be supported on an auxiliary frame of the motor vehicle.

A transverse leaf spring 6 is arranged beneath the upper suspension arm 2, which transverse leaf spring 6 extends along a transverse axis y of the vehicle and is coupled at its end 61 with the upper suspension arm 2.

The coupling of the transverse leaf spring 6 may occur via a connecting rod 5 which connects the suspension arm 2 with the end 61 of the transverse leave spring 6. A rubber or a rubber-metal bearing 52 may be used for a connection between the connecting rod 5 and the transverse leaf spring 6. A connection between the connecting rod 5 and the transverse leaf spring 6 by way of a ball-and-socket joint 52 is within the scope of the present disclosure as an alternative to the rubber bearing.

The transverse leaf spring 6 is fixed to the car body 4 or an auxiliary frame by a bearing 7, for example, in the form of a rubber-metal bearing.

The connecting rod 5 may be arranged in an H-shaped manner in its cross-section, with the upper suspension arm 2 being pivotably mounted in the upper opening of the H and the transverse leaf spring 6 being pivotably mounted on the bottom opening of the H, so that the transverse leaf spring 6 can move in the manner of a rocker during the compression of the wheel 1, or the stub axle.

The stub axle 1 moves upwardly and downwardly guided by the suspension arm 2, with stub axle or wheel 1 being deflected from its compressed position as shown in FIG. 2 with broken lines to a rebound position, as shown in FIG. 2 with a continuous line. The linkage point 3 of the suspension arm 2 on the car body 4 represents the center of rotation for the stub axle 1 and the suspension arm 2. This movement is transmitted onto the transverse leaf spring 6 via the connecting rod 5. The center of rotation of the transverse leaf spring 6 lies in the bearing 7 which fixes the transverse leaf spring 6 to the car body 4.

As a result of the connecting rod 5, which may be mounted along the transverse axis y of the motor vehicle approximately in the middle on the upper suspension arm 2, a stroke 8 of the wheel 1 is not completely transmitted onto the transverse leaf spring 6, but only approximately to half this value. Accordingly, the stroke 9 of the transverse leaf spring 6 is respectively smaller than when fixing the end 61 of the transverse leaf spring 6 directly to the stub axle 1.

The transmission ratio of the stroke 8 of the wheel 1 in relation to the stroke 9 of the transverse leaf spring 6 is determined by a linkage point 53 of the connecting rod 5 on the suspension arm 2, for example, the ratio of the distances A and B as shown in FIG. 2. It is shown that the stroke 9 of the transverse leaf spring 6 decreases with the approach of the linkage point 53 towards the end of the suspension arm 2 on the side of the car body 4. However, the forces acting on the respective linkages increase at the same ratio with the reduction of the stroke 9 of the leaf spring 6. That is why it may be necessary, in accordance with the present disclosure, in the construction of such a wheel or stub axle 1, to choose a useful compromise between the ratio of the stroke 8 of the wheel 1, to the stroke 9 of the transverse the spring 6 and the load on the components.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A wheel suspension of a motor vehicle, the wheel suspension comprising:
    an upper and a lower suspension arm supported on separate linkage points on a car body of the motor vehicle;
    a transverse leaf spring arranged along a transverse axis of the motor vehicle and coupled at a first end of the transverse leaf spring with and located beneath the upper suspension arm, the transverse leaf spring being supported via a bearing on the car body and the transverse leaf spring located above and spaced apart from the lower suspension arm; and
    the first end of the transverse leaf spring is coupled in an articulated manner with the upper suspension arm and the first end of the transverse leaf spring is spaced apart from respective wheel-side ends of the upper and lower suspension arms; wherein the first end of the transverse leaf spring is mounted in an articulated manner on a connecting rod which connecting rod is mounted in an articulated manner on the upper suspension arm.

2. A wheel suspension according to claim 1, wherein the connecting rod is mounted centrally on the upper suspension arm along the transverse axis of the motor vehicle.

3. The wheel suspension according to claim 1, wherein a center of rotation of the transverse leaf spring is mounted on a bearing coupled to the car body.

4. The wheel suspension according to claim 1, wherein the first end of the transverse leaf spring is mounted via a ball-and-socket joint on the connecting rod.

* * * * *